United States Patent [19]

Miller

[11] Patent Number: 4,726,399
[45] Date of Patent: Feb. 23, 1988

[54] MODULAR MANIFOLD

[75] Inventor: James H. Miller, Spring, Tex.

[73] Assignee: Clif Mock Company, Conroe, Tex.

[21] Appl. No.: 33,201

[22] Filed: Apr. 2, 1987

[51] Int. Cl.$^4$ .............................................. F16K 11/10
[52] U.S. Cl. ..................................... 137/884; 137/597; 285/156
[58] Field of Search ............... 137/269, 271, 597, 884, 137/561 R; 285/156

[56] References Cited

U.S. PATENT DOCUMENTS

| | | | |
|---|---|---|---|
| 2,225,153 | 12/1940 | Brown | 137/597 X |
| 2,328,469 | 8/1943 | Laffly | 285/156 X |
| 3,520,315 | 7/1970 | Dobrihin | 137/269 X |
| 4,685,156 | 8/1987 | Bralazon | 137/597 X |

FOREIGN PATENT DOCUMENTS 1196230 11/1959 France .................................. 285/156
27411 of 1898 United Kingdom ................ 285/156

Primary Examiner—A. Michael Chambers
Assistant Examiner—John C. Fox
Attorney, Agent, or Firm—Robert W. B. Dickerson

[57] ABSTRACT

A manifold device having a plurality of fittings, each fitting having fluid passageway means therethrough, at least some of said fittings being adapted to receive valving, such fittings being adapted to expandably form a manifold having an unrestricted number of valve controls.

2 Claims, 10 Drawing Figures

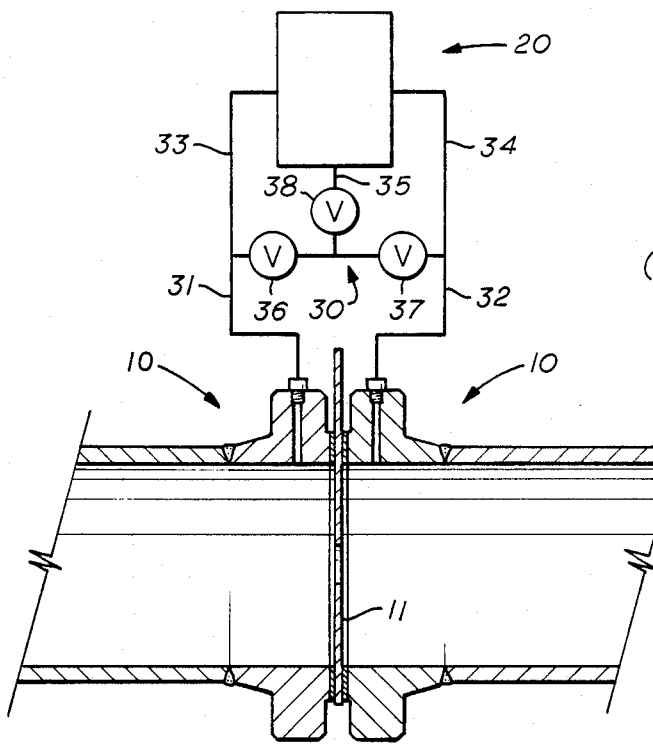
FIG. 1 (OLD ART)
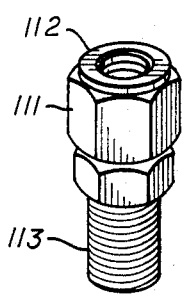
FIG. 5B
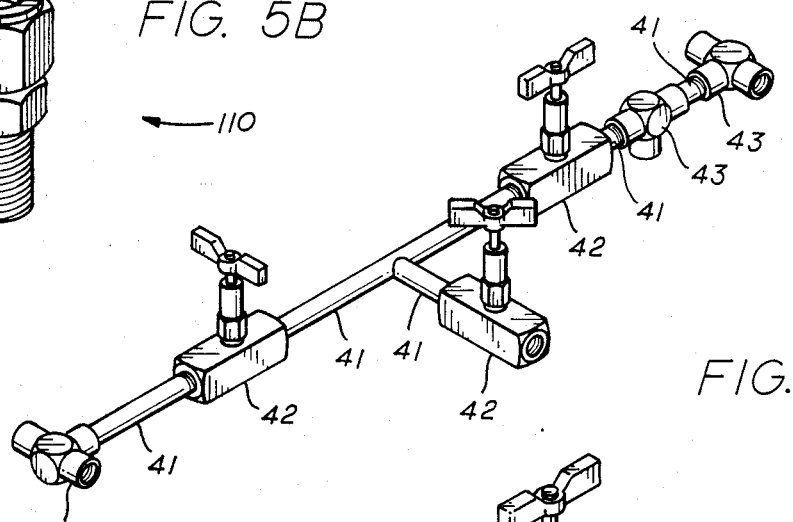
FIG. 2
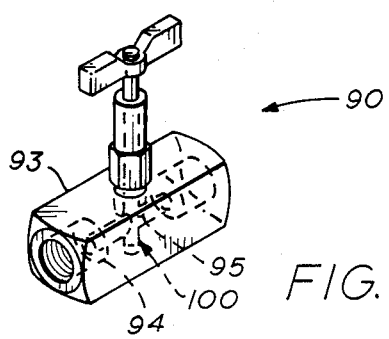
FIG. 5A

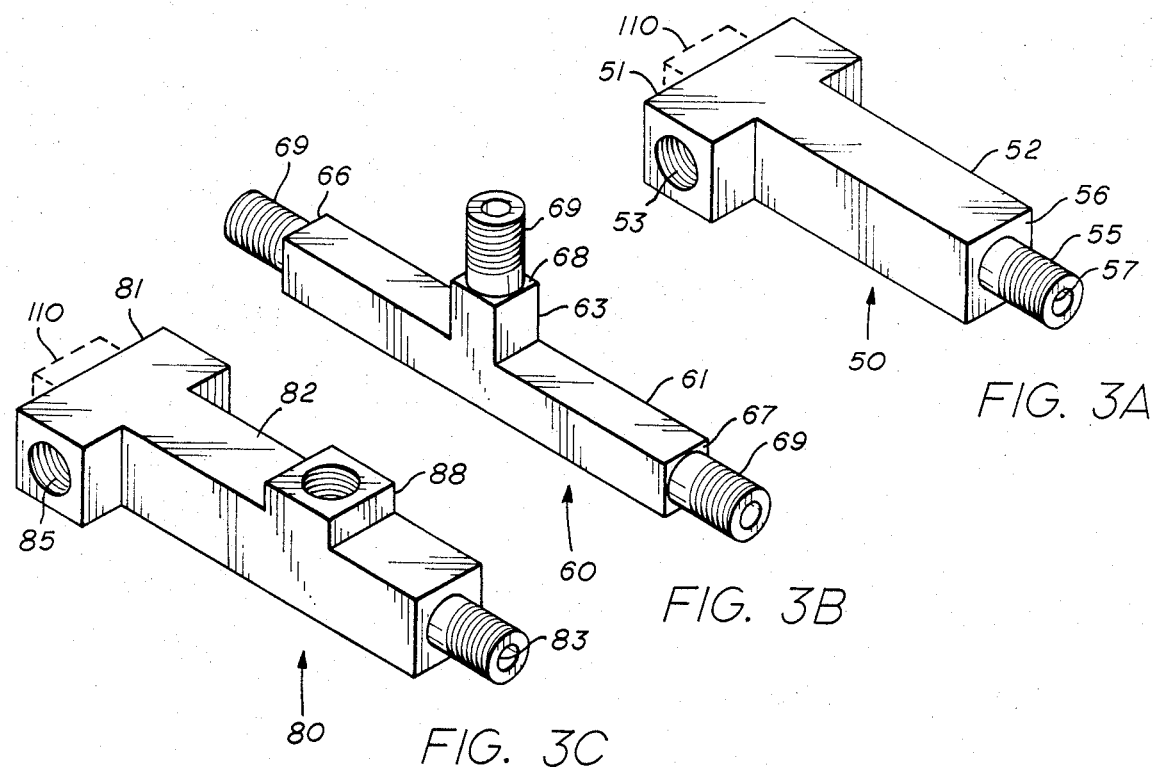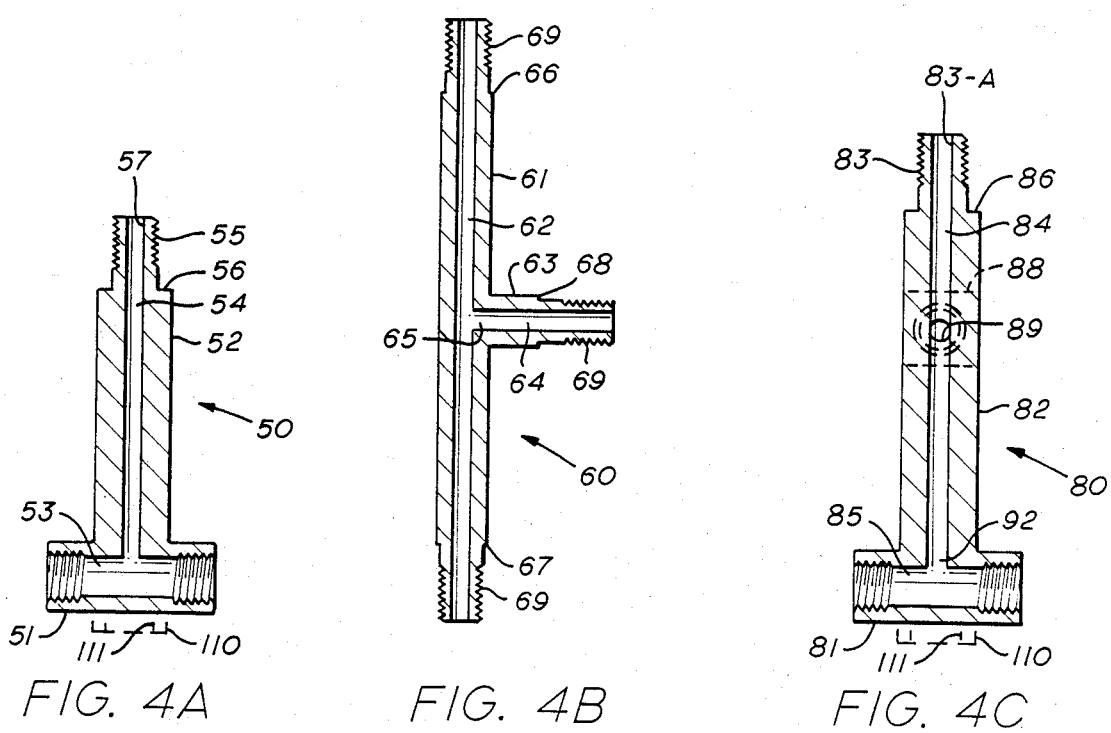

MODULAR MANIFOLD

BACKGROUND OF THE INVENTION

A manifold is defined simply as a pipe having a number of fittings so as to make multiple connections. One of the plethora of uses of manifolds lies in the area of fluid measurement. Fluid, such as gas, may be sampled on opposite sides of an orifice plate, which plate is positioned centrally of a fluid carrying pipe. The sampled gas, for example, is ultimately conveyed to a pressure recorder for ultimately measuring and recording quantities of gas passing through said pipe. Intermediate such fluid carrying pipe and the recorder, the sampled fluid passes through portions of a mainfold. The prime purpose of such manifold is to control the pressure of the gas going to the delicate components of the pressure recorder.

Depending on the particular use, a varying number of fittings may be required of a manifold. Sometimes it is desirable to field adjust the number of such fittings. It is therefore desirable for a manifold to be simply made-up, and easily modified, as distinct from requiring a complete new manifold when only a slight change in performance is required. Applicant's invention addresses this particular need.

SUMMARY OF THE INVENTION

A manifold of an unlimited number of connections is made possible by the use of just 3 modular components. Each component is cast, includes an axial passageway therethrough, and at least one intersecting, lateral passageway. Threaded nipples on each end piece and the central component permit linking adjacent components via female threaded couplings. Such couplings may comprise the housing of a needle valve assembly. Threaded lug extensions also permit needle valve control of said central component. Further one end piece modification includes an interiorly threaded lug having a lateral passageway communicating with its axial passageway. The lateral passageway may in turn communicate with the pressure recorder, for any number of purposes, such as to provide an indication of static pressure. Thus the interchangeable use of two variations of an end piece and a central component, permits the formation of an endless number of fluid connections.

DESCRIPTION OF THE DRAWINGS

FIG. 1 is a partly schematic, broken axial section through a pipe conduit shown linked to a recorder through manifold;

FIG. 2 is a perspective of a typical manifold as presently available;

FIGS. 3A, 3B, and 3C are, respectively, perspectives of the 3 modular components of applicant's manifold;

FIGS. 4A, 4B and 4C are, respectively, axial sections through the components of FIGS. 3A, 3B and 3C; and FIG. 5A is a perspective of a typical needle valve assembly, while FIG. 5B is a perspective of a typical ferruled tubing connector.

DESCRIPTION OF A PREFERRED EMBODIMENT

One typical use of manifolds has been in conjunction with differential pressure recorders, such as the Series 1200 by Clif Mock Company. As generally illustrated by FIG. 1, the recorder 20 samples fluid (gas) from upstream and downstream sides of an orifice plate 11 carried by adjacent, flanged pipe sections 10. Such fluid would enter manifold 30 from meter tubes (not shown) through conduits 31, 32. The manifold illustrated includes three needle valves 36, 37 and 38. The fluid would enter opposite sides of a bellows assembly (not specifically illustrated) carried by recorder 20, through conduits 33, 34. Additional sampled fluid may be conveyed to recorder 20, such as to a helical pressure element thereof, through conduit 35. Regulation, in a known manner, of fluid flow into recorder 20, by valves 36, 37, 38, would protect delicate instrumentation. Obviously, any number of fittings, ie, fluid outlets from manifold 10, may be required and provided. Prior Art manifolds generally comprise threaded pipe sections 41 engaged with needle valve housings 42 centrally thereof, and TEE fittings 43 at or near the extremities (see FIG. 2).

Consider now this invention, as depicted in FIGS. 3 and 4. Three components (including possibly multiple center components) permit makeup of a manifold having as many conduit connections as desired. FIGS. 3A and 4A, depict the standard end piece 50. As previously mentioned, each of the depicted components is preferably cast, rather than machined and bored. Substantial cost savings are thereby effected. Member 50 is generally TEE-shaped, with cross bar 51 and central leg 52 depending therefrom. Both portions 51 and 52 are generally square shaped in cross section. Cross bar 51 includes axial passageway or conduit 53 therethrough, female threads, preferably NPT, being formed at opposite ends of said passageway. Likewise, central leg 52 includes axial passageway 54 therethrough, the same intersecting and communicating with conduit 53. Reduced diameter nipple 55 depends from the free end 56 of leg 52. Said nipple has male threads (preferably NPT) at one end thereof. Said nipple also includes an axial conduit 57 therethrough, constituting a linear extension of passageway 54.

Look now at FIGS. 3B and 4B, which depict the central member 60. It includes an axial fluid passageway 62 through its housing portion 61. Lug or boss 63 depends from housing 61. Said boss also includes axial passageway or conduit 64 which communicates with lateral passageway 65 of housing 61, which lateral passageway also communicates with housing axial passageway 62. Each of housing ends 66, 67 and lug end 68 include depending, NPT threaded nipples 69.

In the modified end piece of FIGS. 3C and 4C, other than perhaps a longer central leg 82, end piece 80 is substantially like end piece 50, except for lug or boss 88. For example, the TEE shape continues, with cross bar 81. All portions 81, 82 and 88 possess axial passageways therethrough, namely 85, 84, and 89. Passageway 85 has interior, female, NPT threads at each end. Nipple 83, like other end piece member 55, depends from housing 86 of central leg 82. Said nipple includes male NPT threads at its end opposite said central leg. Lug 88 also laterally depends from central leg 82, and includes interiorly NPT threaded, axial passageway 89. Nipple Passageway 83-A communicates with passageway 84. Said latter mentioned conduit communicates with conduit 89. Further, cross bar passageway 85 communicates with lateral conduit 92, and it, in turn with conduit 84.

The standard needle valve assembly 90 of FIG. 5A includes cylindrical housing 93 with axial and lateral, interiorly female threaded, intersecting bores 94, 95, with linearly movable valve body (generally indicated at 100), adapted to adjust the flow of fluid through conduit or bore 94.

The standard ferruled, axially bored, tubing connector 110 of FIG. 5B includes male, NPT threads at its opposite ends, with female threaded nut 111 adapted to crimp the thin walled end 112 about the end of any tubing inserted within said thin walled end. The opposite end 113 may threadedly engage the threads of passageway 89.

In some applications, the end pieces of FIGS. 3A or 3C may either have lug extension 110 depending from cross bar 51 or 81. Such extension 110 would be centrally apertured, at at 111, or subject to being aperutred, any such aperture adapted to be in communication with apertures 54 or 84 of leg 52 or 82.

Prior to assembly, the user must determine the required number of fluid connections required, and consider the space limitations. The simplest manifold would include two regular end pieces (FIGS. 3A, 4A), positioned opposite each other, ie, with their respective nipple portions 52 in a facing relationship.

Each such nipple would be threadedly received by the typical needle valve housing of FIG. 5A. Fluid flowing through conduits 53 of end pieces 50, from opposite sides of orifice plate 11, to opposite sides of the bellows of recorder 20, would be controlled by said needle valve assembly 90. This arrangement would provide one degree of control.

Should additional width and/or valve controls be needed, one or more central members 60 may be inserted intermediate oppositely disposed end pieces 50. Each nippled end of each end piece and central member would be engaged with one female threaded passageway opening 94, of a needle valve assembly 90, ie, such an assembly 90 would be positioned intermediate each adjacent modular component, be it member 50, 60 or 80. With two end pieces 50, one central member 60, two needle valve assemblies joining said central member 60 to each end piece respectively, and one needle valve assembly 90 linked to nipple 69 of said central member, three degrees of control are provided.

Should it be desired, one or more end pieces 80 could be substituted for end pieces 50. This would provide, for each end piece, an additional fluid connection between the manifold and the controlled object, such as recorder 20. End 113 of the ferruled, tubing connector 110 would be threadedly engaged with the female threads of passageway 89. The other end would be caused to crimp about, and thereby secure one end of a tube, such as exemplified by numeral 35 in FIG. 1, to said connector.

In summation, be devising a modular arrangement of a maximum of 3 components, plus intermediate needle valve assemblies commercially available, manifolds of unlimited degrees of control may rapidly be made up or knocked down. Such manipulation may occur in the field. Additional fluid connections between the manifold and the controlled body may be provided. All this may be accomplished without the user having to stock an unlimited number of diverse parts.

Although limited arrangements of Applicant's invention have been described, it should be obvious that numerous modifications would be possible by one skilled in the art without departing from the spirit of the invention, the scope of which is limited only by the following claims.

What is claimed is:

1. A modular manifold comprising at least two of the following components: (a) and end piece, (b) a modified end piece, and (c) a central member:

said end piece comprising
an integral housing of TEE configuration having a cross bar and a depending central leg, said bar and leg each having an axial fluid passageway therethrough, and in communication with each other, said cross bar passageway including female threads at each end thereof, said central leg further having a male threaded nipple depending from said leg's end opposite said bar, said nipple having a lesser diameter than said leg's end and an axial fluid passageway therethrough and in communication with said leg's passageway;

said modified end piece comprising
an integral housng of TEE configuration having a cross bar and a depending central leg, said bar and leg each having an axial fluid passageway therethrough, and in communication with each other, said cross bar passageway including female threads at each end thereof, said central leg further having a male threaded nipple depending from said leg's end opposite said bar, said nipple having a lesser diameter than said leg's end and an axial fluid passageway therethrough and in communication with said leg's passageway, said central leg also including a lug laterally depending therefrom, intermediate said bar and nipple, said lug having a female threaded axial passageway therethrough in communication with leg's passageway; and said central member comprising
an integral cylindrical housing having an axial, fluid passageway therethrough, a male threaded nipple depending from opposite ends of said housing, each said nipple also having an axial, fluid passageway therethrough aligned with said housing's passageway, and a lug with a depending male threaded nipple laterally depending from said housing, said lateral lug and depending nipple also having aligned axial passageways therethrough in communication with said housing's passageway, each of said nipples being male threaded and of lesser diameter than its respective housing end or lug.

2. A manifold comprising at least two components selected from (a) an end piece (b) a modified end piece, and a further component comprising (c) a central member, each adjacent component being joined together by a valve member:

said end piece comprising
an integral housing of TEE configuration having a cross bar and a depending central leg, said bar and leg each having an axial fluid passageway therethrough, and in communication with each other, said cross bar passageway including female threads at each end thereof, said central leg further having a male threaded nipple depending from said leg's end opposite said bar, said nipple having a lesser diameter than said leg's end and an axial fluid passageway therethrough and in communication with said leg's passageway:

said modified end piece comprising
an integral housing of TEE configuration having a cross bar and a depending central leg, said bar and leg each having an axial fluid passageway therethrough, and in communication with each other, said cross bar passageway including female threads at each end thereof, said central leg further having a male threaded nipple depending from said leg's end opposite said bar, said nipple having a lesser diameter than said leg's end and an axial fluid passageway therethrough and in communication with said leg's passageway, said central leg also including a lug laterally depending therefrom, intermediate said bar and nipple, said lug having a female threaded axial passageway therethrough in communication with leg's passageway; and said central member comprising an integral cylindrical housing having an axial, fluid passageway therethrough, a male threaded nipple depending from opposite ends of said housing, each said nipple also having an axial, fluid passageway therethrough aligned with said housing's passageway, and a lug with a depending male threaded nipple laterally depending from said housing, said lateral lug and depending nipple also having aligned axial passageways therethrough in communication with said housing's passageway, each of said nipples being male threaded and of lesser diameter than its respective housing end or lug.

* * * * *